United States Patent
Dorenbosch

[19]

[11] Patent Number: 6,052,562
[45] Date of Patent: Apr. 18, 2000

[54] METHOD AND APPARATUS FOR COORDINATING AN OPERATING CHANNEL SELECTION

[75] Inventor: Jheroen Pieter Dorenbosch, Paradise, Tex.

[73] Assignee: Motorola, Inc., Schaumburg, Ill.

[21] Appl. No.: 08/924,004

[22] Filed: Aug. 29, 1997

[51] Int. Cl.$^7$ .................................................. H04Q 7/00
[52] U.S. Cl. ....................... 455/38.1; 455/166.2
[58] Field of Search ...................... 455/166.2, 434, 455/381, 38.3, 34.1, 166.1; 340/82.44

[56] References Cited

U.S. PATENT DOCUMENTS

| | | | |
|---|---|---|---|
| 4,849,750 | 7/1989 | Andros et al. ............................ | 340/94 |
| 4,881,073 | 11/1989 | Andros et al. ......................... | 340/825 |
| 4,897,835 | 1/1990 | Gaskill et al. ......................... | 370/94.1 |
| 4,935,732 | 6/1990 | Andros et al. ..................... | 340/925.44 |
| 5,740,534 | 4/1998 | Ayerst et al. .......................... | 455/434 |
| 5,778,316 | 7/1998 | Persson et al. ........................ | 455/434 |

*Primary Examiner*—Darnell Armstrong
*Attorney, Agent, or Firm*—Charles W. Bethards

[57] ABSTRACT

Methods of and corresponding apparatus for scheduling messages on an operating channel (123) in a selective messaging system (100) for a selective messaging unit (135) include choosing a preferred channel (711) from a first channel and a second channel, setting a first priority for the first channel (713) and a second priority for the second channel, the priorities, for example by relative magnitude, corresponding to the preferred channel, and scheduling a message (715) for the selective messaging unit on the preferred channel. Analogously, at the selective messaging unit a method of selecting an operating channel includes detecting a first priority signal corresponding to the first channel (621) and a second priority signal corresponding to the second channel, and based on a comparison of the priority signals (623) selecting the operating channel (625) from the first and second channel.

22 Claims, 5 Drawing Sheets

METHOD AND APPARATUS FOR COORDINATING AN OPERATING CHANNEL SELECTION

FIELD OF THE INVENTION

This invention relates generally to communication systems and ore specifically but not limited to methods and corresponding apparatus for coordinating an operating channel selection.

BACKGROUND OF THE INVENTION

Communications systems, especially messaging and paging systems or subsystems, typically operate on a channel having a radio frequency that provides coverage over a generally defined area. The number of subscribers served by these systems is limited by the spectral capacity of the channel where this capacity is the amount of information that the channel may convey. As the number of subscribers grows or the amount of information that a given subscriber or messaging unit wants to convey or receive over the channel increases, there may be no choice other than to deploy additional systems or subsystems having additional channels and frequencies.

These additional systems or channels likely create problems for system operators and messaging units or users thereof. Specifically operating channels for the units and the systems must now be coordinated such that messages may be delivered to a unit without undue waste of system capacity caused by retries or broadcasting the message on multiple channels. Various approaches have been proposed or utilized, such as carrying multiple messaging units each operable on a different channel. Obviously this is overly burdensome and inconvenient. Another approach is providing an ordered listing of channels for the messaging unit at, for example, initial activation. The unit, at power up, searches the ordered list, selects an operating channel, and remains monitoring the highest ordered or highest status channel it can reliably receive. The unit may rescan the list when the current channel is lost or from time to time as in background scanning. This approach is relatively inflexible and usually limited, given practicalities to a two or maybe three channel situation.

The system may duplicate messages on multiple channels but this inefficiently uses channel capacity and basically defeats the purpose of the extra channels. One approach has been proposed by Gaskill, et al. U.S. Pat. No. 4,897,835. Gaskill et al. suggests that the messaging system tells the messaging unit to tune to a particular channel. Subsequent messages are broadcast only on that channel frequency. Drawbacks to Gaskill include sending the tuning message on all channels the messaging unit may be on, thus wasting capacity, and the possibility is that the messaging unit does not receive the tuning message thus missing subsequent messages.

Clearly a need exists to automatically allow a system and a messaging unit to adequately and routinely coordinate, modify, and effect the operating channels available to and used by messaging units.

BRIEF DESCRIPTION OF THE DRAWINGS

The features of the present invention that are believed to be novel are set forth with particularity in the appended claims. However, the invention together with further advantages thereof, may best be understood by reference to the accompanying drawings wherein:

DETAILED DESCRIPTION OF A PREFERRED EMBODIMENT

The present disclosure concerns communications systems, such as selective messaging systems and constituent elements thereof that are arranged to provide area wide coverage using multiple frequencies and more specifically methods and apparatus to facilitate coordination of an operating channel for use in such systems. One embodiment is a method of selecting an operating channel set in a selective messaging unit. The method includes detecting a first priority signal and a second priority signal corresponding, respectively, to a first channel and a second channel; comparing the first priority signal and the second priority signal to provide a comparison; and selecting, based on the comparison, the operating channel from the first channel and the second channel.

The method further includes, preferably, a step of scanning a channel list that includes the first and the second channel and detecting multiple equivalent status channels. The steps of the method are preferably repeated from time to time in a process commonly known as background scanning when the operating channel is selected according to this method. In any event when this method is used, as preferred, in a two way system it will typically include a step of registering on the selected operating channel.

A related method of communicating a channel preference to a selective messaging unit is set in a selective messaging system. This method includes choosing a preferred channel from a first channel and a second channel; setting a first priority for the first channel and a second priority for the second channel, the first priority and the second priority selected, with, for example, the first exceeding the second priority, to thus correspond to or indicate or reflect the preferred channel; and then scheduling a message for the selective messaging unit that corresponds to the preferred channel. Preferably a message is scheduled on the first and on the second channel and the unit when or if it has received both messages may select or discern the preferred channel by, for example, comparing the first channel to the second channel, else use the only channel it receives.

Various approaches for choosing a preferred channel are contemplated with a preferred approach including a step of monitoring an operational parameter or operator preference and ordering or rank ordering, to correspond to a preference assessment, channels from a channel list in accordance with the operational parameter or operator preference or some combination of each. A step of looking for and detecting a change in the operational parameter, such as channel loading, or operator preference, such as channel availability due to maintenance or unusual events, and responsive thereto repeating the steps of choosing, setting, and scheduling is also preferably included.

An apparatus embodiment is a selective messaging unit arranged to select an operating channel. This selective messaging unit includes a receiver for scanning channels and detecting a first priority signal and a second priority signal corresponding, respectively, to a first channel and a second channel; and a controller coupled to the receiver and arranged to compare the first priority signal and the second priority signal; and, responsive thereto, select the operating channel from the first channel and the second channel. The receiver and controller additionally perform the analogous steps associated with the above discussed method. Additionally the selective messaging unit in a two way form has a transmitter, coupled to the controller, that operates to transmit a registration signal on the operating channel.

A further apparatus embodiment is a selective messaging system controller that is arranged for communicating a channel preference to a selective messaging unit. The selective messaging system includes a memory for storing a channel list including a first channel and a second channel; and a processor for choosing a preferred channel from the first channel and the second channel; setting a first priority for the first channel and a second priority for the second channel, where the first priority and the second priority are selected to correspond to the preferred channel, and thereafter scheduling a message for the selective messaging unit that corresponds to the preferred channel. This message is preferably two messages one on the first and one on the second channel.

The memory of the selective messaging system controller preferably, stores various operational parameters and operating preferences. The processor monitors these parameters and preferences and orders or rank orders, according to a preference for using a channel, the channels from the channel list to correspond to or in accordance with one or more or some combination of the operational parameters or operator preferences. If the processor detects a change in the parameters or preferences it, preferably, repeats the operations of choosing, setting, and scheduling.

Figure 1:
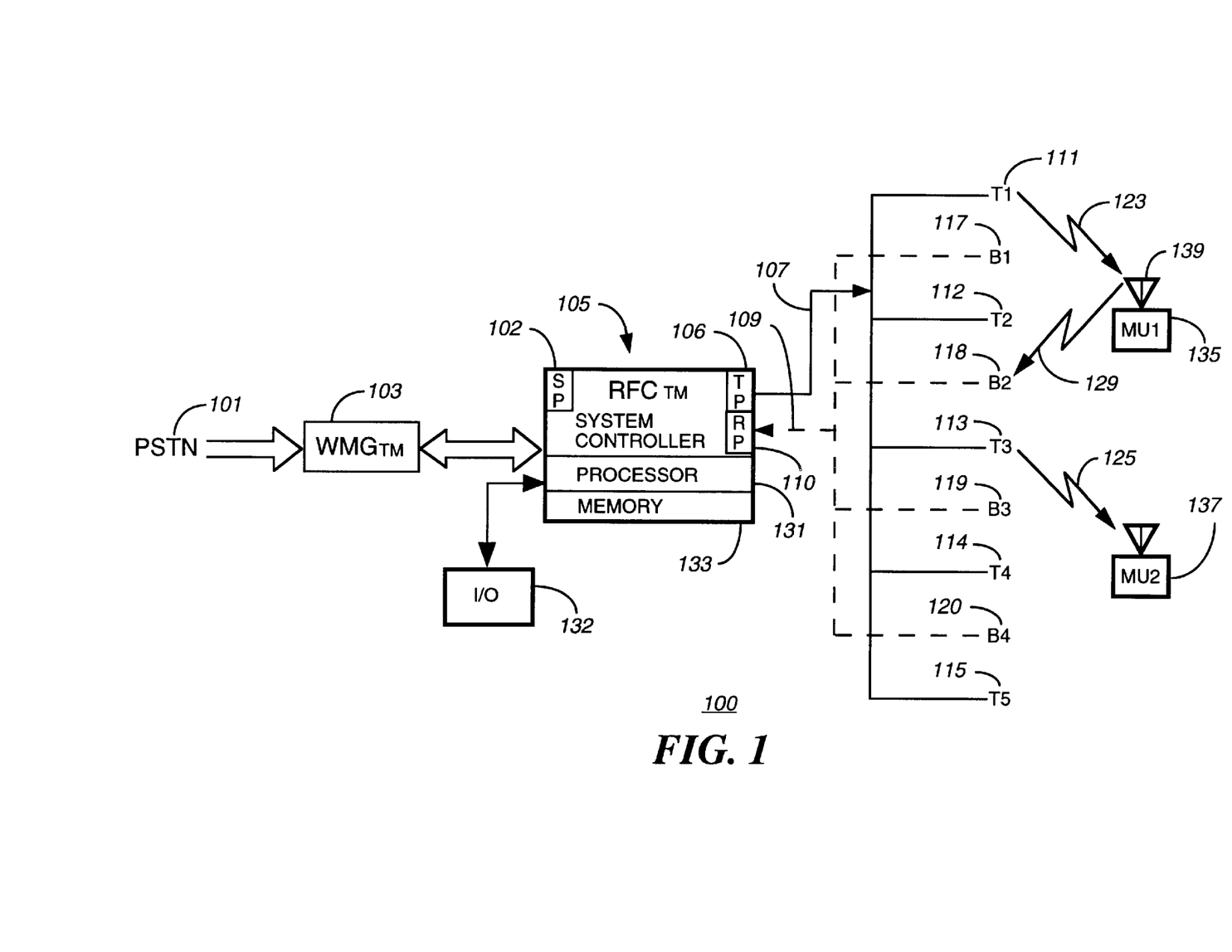
FIG. 1 is a block diagram of a selective messaging system suitable for employing an embodiment in accordance with the instant invention.

Continuing the present disclosure in more detail the reader is referred to the FIG. 1 depiction of a representative paging or messaging system (100), preferably, a selective two-way messaging system, but alternatively a one-way messaging system, communicating with a plurality, two depicted, of messaging units (135, 137). The messaging system (100) includes a gateway or terminal (103), coupled to a message source such as the public switched telephone network (101). The terminal (103) is available from Motorola as the WMG™ product as well as from other manufacturers. The terminal is coupled to, often collocated with, a system controller or controller (105), such as a Motorola RF CONDUCTOR™ suitably modified with the inventive principles discussed herein. The terminal (103) and system controller (105), coupled together by switch port (102) operate together to communicate messages such as messages with destination addresses for various messaging units (135, 137) from the terminal (103) to the system controller (105) or various responses, in the case of a two-way system, back to the terminal (103), thus to the PSTN (101) and the originator.

The messaging system (100) includes, coupled to the controller (105), via a transmitter port (106), by the outbound network channel (107), a plurality of transmitters with five depicted as a first through 5th transmitter (111 . . . 115). The transmitters are available, for example, as Motorola NUCLEUS II™ transmitters or from other suppliers. The outbound network channel (107) is preferably leased telephone lines but may be any suitable media operating with any suitable networking or communication protocol including a radio or satellite link. The system or subsystem, specifically controller and transmitters are arranged and constructed and operate to provide coverage and service in one or more geographic areas, service areas, or zones such as the areas that will be discussed below with reference to FIG. 5. It is understood that the FIG. 1 system is exemplary only and that much other equipment not here shown nor here relevant may be required in a practical system.

Additionally, the messaging system (100), in its preferred two-way form, includes, coupled to the system controller (105), via a receiver port (110), by a network channel (109), a plurality of base receivers, such as four depicted base receivers (117–120). The network channel is preferably leased telephone lines or any other suitable network link with the bandwidth necessary for the traffic expected on the channel. Typically at least some of the base receivers will be deployed at geographic locations different from the transmitters and typically more receivers are deployed than transmitters.

Generally the messaging system is a scheduled system using a protocol such as the FLEX™ one-way or, preferably, ReFLEX™ two-way protocols by Motorola where all messages outbound or inbound are transmitted within time slots in a time frame on an outbound or inbound channel (123, 129) each normally a different radio frequency. Typically within a given system or specifically zone or subsystem within the system all transmitters operate on the same outbound frequency or channel and often in a simulcast (nearly identical launchtime) mode. In contrast systems or subsystems providing overlapping coverage such as those shown in FIG. 5 will normally operate on a different channel and frequency. The system controller provides control of the system including scheduling outbound or inbound messages for messaging units that are registered on or subscribe to the system's services. The system controller (105) is responsible for maintaining the schedule, designating what channel(s) if need be and respective transmitter(s) or radio frequency(ies) and when within the overall schedule for each channel, a message for a messaging unit will be transmitted, notifying messaging units of the time slot where they will receive messages and, if two way units, during what inbound time slot they are expected to acknowledge receipt of the message and what inbound slots are available for volitionally originated messages, according to a slotted ALOHA contention algorithm.

The outbound messages including control or block messages are forwarded to the transmitters for subsequent transmission to one or more messaging units, such as the depicted messaging units (MU) (135,137) in accordance with the system protocol at a particular time on the forward or outbound radio channels (123, 125). Messages originating at the messaging unit (135), either volitionally as in a registration request or responsive to a received message, such as an acknowledgment, are coupled by the reverse or inbound radio channel (129) to one or more of the base receivers where they are forwarded or relayed to the system controller on the inbound or network channel (109). The system controller may use these inbound messages for scheduling decisions, such as repeats, may forward them to the terminal, if, for example, they are intended for a user destination, or may use them as operational parameters to perform various traffic analysis and system management or configuration functions.

Referring to the more detailed diagram of the system controller (105), the general operation and basic structure of the controller will be explained. As above noted the controller or messaging system controller is adapted for scheduling messages on one or more channels or operating channels. The messaging system controller includes a processor (131) that is, preferably based on a 32 bit Super-SPARC microprocessor designed and distributed primarily by Sun Microelectronics.

The processor (131) is coupled to the various input output ports, specifically switch, transmitter, and receiver ports (102, 106, 110), an operator I/O (132), preferably terminal, and further coupled to a memory (133). The memory (133) is a combination of disk, ROM, and RAM based storage suitable for storing all operating software as well as database information required by the system controller (105). In the exemplary diagram of FIG. 1 the controller is shown as a single entity. However it is understood that the controller and the terminal (103), either or both, may be composed of distributed terminal or distributed controller functions or resources and may be either collocated or located at a plurality of physical locations. This situation would likely be encountered in a large paging system such as the systems of FIG. 5, that included, for example, some form of roaming capability. Similarly while the FIG. 1 depiction shows one controller and other system components all of these functions may be resident at one location or multiple locations depending on system loading and complexity and countless other variables.

Figure 3:
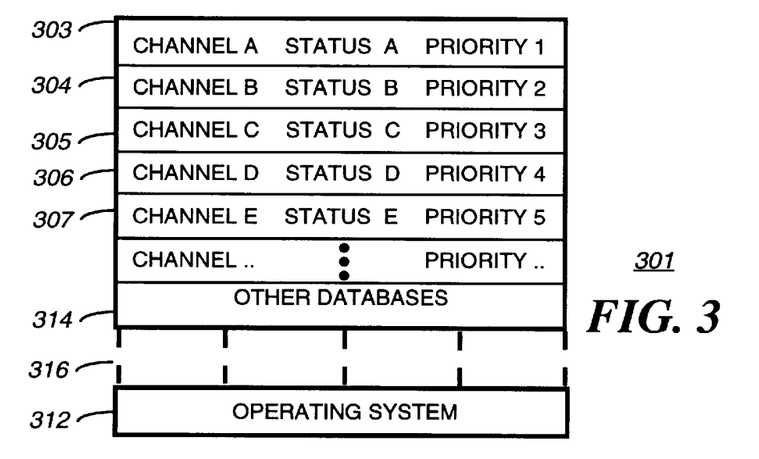
FIG. 3 is a illustrative map of contents of a memory suitable for use in the FIG. 2 selective messaging unit.

The memory (133) of the system controller (105) is also used to retain information on a list of the channels used by the plurality of transmitters that are managed by the system controller (105). The reader is referred to the FIG. 3 depiction of an illustrative map of contents of memory (301). This map generally applies to either the memory (133) of the system controller or the memory (221) of a selective messaging unit. The list of potential operating channels for a selective messaging unit is a subset of the list of channels used by the system controller (105) and is usually determined at the time the selective messaging unit is activated or when service is originally subscribed to. In either case the memory contains the list of potential operating channels (Channel A through Channel . . . ) (303–307) for the unit. In addition to the list of channels the memory may include the operating system (312), other databases (314), and other functions (316). The memory, preferably also contains, associated with channels (Channel A through Channel E), their corresponding priority (Priority 1 through Priority 5) (321–325), as well as, optionally status (Status a through Status e) (331–335). Upon activation the selective messaging unit is provided with an operating channel, for example channel (223) that usually has a higher status than other channels in the list. This higher status channel is the outbound and, preferably, inbound frequency or channel and may occupy the channel A (303) or "top" location in memory. Ordinarily some other operating channels, such as large coverage areas or region wide channels, would have different and usually lower status levels. The priorities (321–325) or channel priorities correspond to information that a selective messaging unit will receive for channels it receives when scanning or otherwise monitoring the channel as further explained below.

Figure 4:
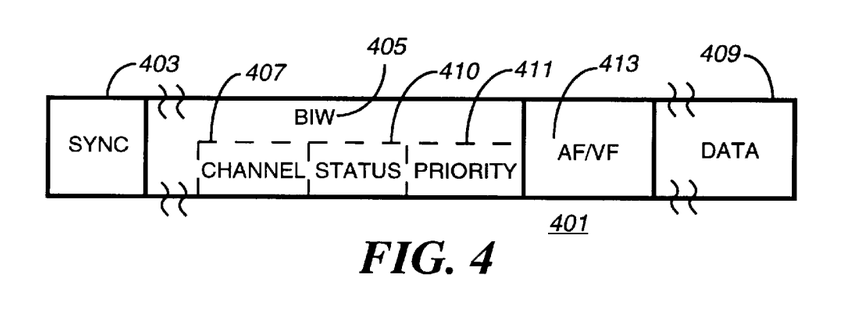
FIG. 4 is an exemplary protocol diagram.

When the system controller (103) sends messages to the selective messaging unit, the message includes information depicted in the exemplary protocol diagram (401) shown in FIG. 4. The synchronization or sync (403) provides for synchronizing the incoming signal and the selective messaging unit and is well known. The data (409) portion of the message typically includes information intended to be conveyed to the user of a selective messaging unit, that has been identified in the address/vector field (407). This field will have an address that corresponds to a selective messaging unit and a corresponding vector that points to a location in the data or message field (409).

The Block Information Words or BIW (405) is used by the system controller (105) to inform the selective messaging unit of various system configuration parameters. Included in the BIW is a channel (407) that represents or corresponds to the frequency or channel or other coverage entity, such as a zone, that the selective messaging unit is presently receiving. The BIW also includes a priority (411) corresponding to the channel (407) or zone that is determined by the system controller (105). This priority (411) allows the system controller (105) to statically or dynamically coordinate or initiate the selection of the operating channel by a messaging unit. Once selected, such as by registration, this channel is utilized by the controller to transmit or deliver messages to the selective messaging unit. The BIW (405) optionally may include a status field (410). If present, the status may be used to modify the status of a channel for all relevant units. The priority for a channel is determined by the controller and will be based on one or more operational parameters, such as loading on various channels or operator preferences such as desired service levels or other channel availability criteria as further explained.

Figure 2:
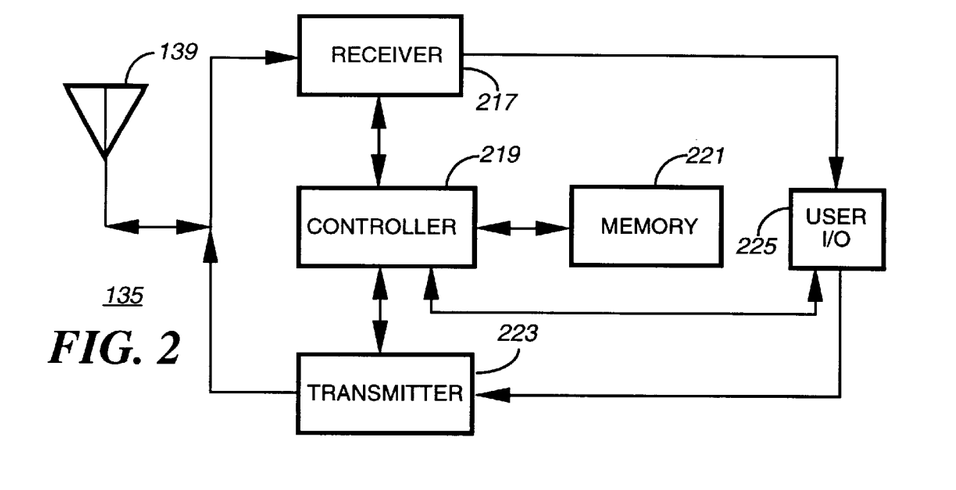
FIG. 2 is a more detailed block diagram of a selective messaging unit suitable for use in the FIG. 1 messaging system and in accordance with the instant invention.

Continuing the present disclosure the reader is referred to the FIG. 2 block diagram of a selective messaging unit, such as unit (135), for the following discussion. Selective messaging units are available from Motorola and other suppliers and are commonly known as pagers. The ordinary pager would need to be modified in accordance with the inventive principles disclosed herein and this modification would normally be a change in the operating system readily implemented by one skilled in the art in view of the principles herein. FIG. 3 depicts a selective messaging unit arranged and constructed for coordinating the selection of an operating channel. The unit includes an antenna (139), coupled to a receiver (217) and a transmitter (223). The antenna (139) operates to absorb radio signals and couple them to the receiver (217), and, in the preferred two-way selective messaging unit, to radiate radio signals coupled to the antenna from the transmitter (223). The user I/O (325) is coupled to the receiver and the transmitter and a controller (219) and represents the medium, such as displays and pushbuttons, by which the selective messaging unit and the user communicate, in appropriate formats, messages and often, in the case of a preferred two-way messaging unit, responses.

The receiver includes generally known elements such as filters, amplifiers, mixers, frequency generation units or synthesizers, demodulators, decoders, and the like and is coupled to and under the control of the controller (219). The controller, for example, programs the synthesizer thus tuning the receiver to and allowing it to operate to monitor a channel and receive various messages on that channel. The receiver scans channels or is scanning channels as the synthesizer is successively programmed for one channel after another. Once a message is decoded or partly decoded the receiver together with the controller can check the message to see if the BIW (411) is of interest as well as, for example check the address field for correspondence with the address of the selective messaging unit. If a BIW, the various system configuration commands, or information may be appropriately used, the channel or zone cross referenced with the channel list, and the status (410) and priority (411), when available, updated in the list if appropriate.

The selective messaging unit is arranged to select or facilitate selection of an operating channel. To do so the receiver (217) scans the channels stored or the channel list in the memory (221) of the selective messaging unit. Many if not all channels in the list of channels have an associated priority while scanning the channels the receiver detect these priorities from the BIW (407) as priority signals corresponding to their channels or zones. The controller (219), coupled to the receiver (217), is arranged to compare these priority signals. Based on the resultant comparisons against the priority signals the controller selects an operating channel from the list of channels. In the preferred form where the channel list may include channels of varying states with and without priorities the receiver (217), while scanning, detects there exists areas of a plurality of equivalent status channels. In this case the highest priority or most suitable priority channel is selected as the operating channel. The receiver (217) and the controller (219) together will preferably, repeat from time to time or periodically the aforementioned operations including scanning, detecting, and comparing in order to update the selection of the most appropriate operating channel. Once the selective messaging unit has determined the most appropriate operating channel, the transmitter (323) which is coupled to the controller (319) in the preferred two-way selective messaging unit will be used to register with the selective messaging system on that operating channel according to generally known procedures, including formulating and transmitting a registration message on an inbound channel that identifies the selective messaging unit and the desired or selected operating channel.

Figure 5:
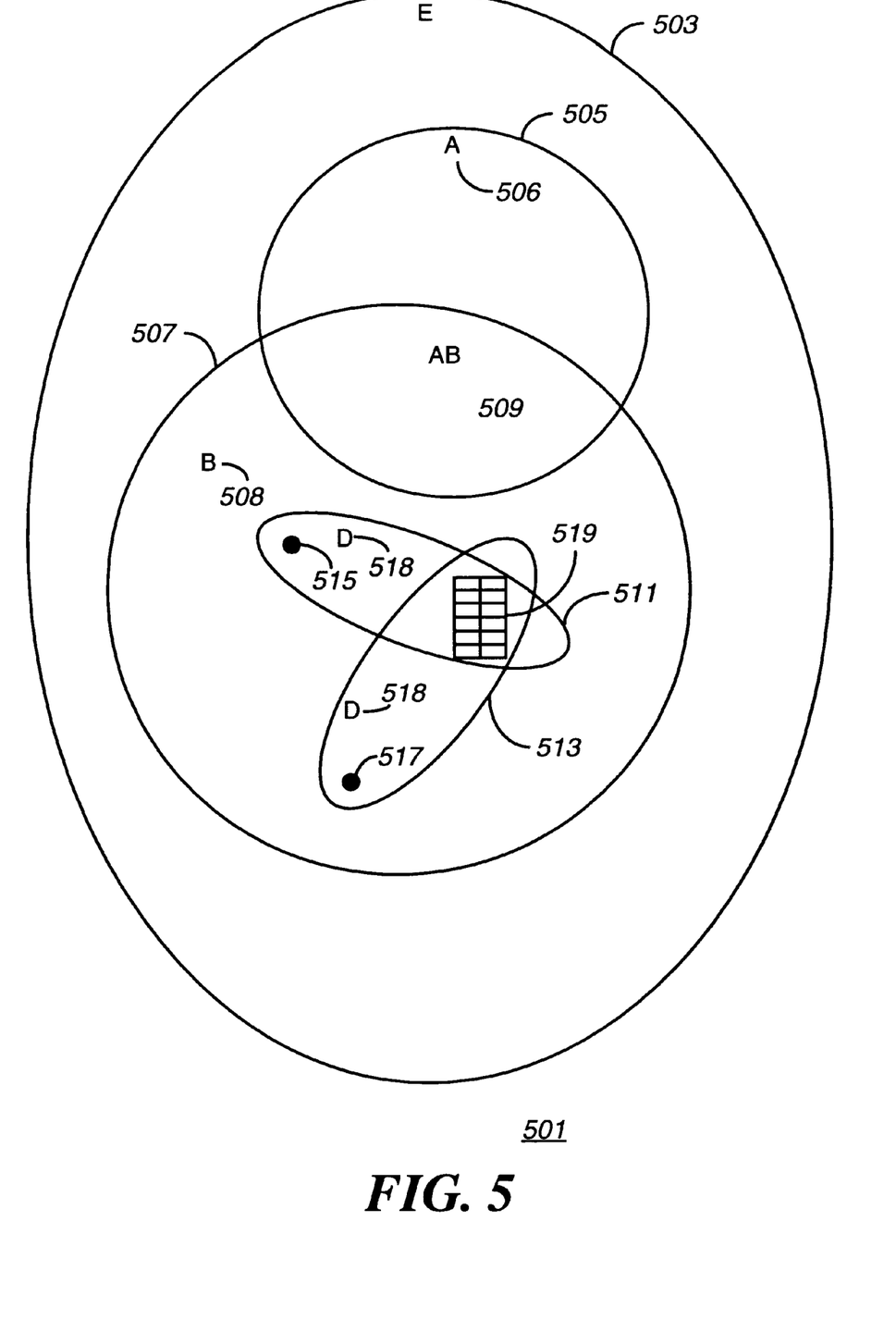
FIG. 5 is an illustrative coverage map for a plurality of coverage areas.

Referring to the FIG. 5 illustrative coverage map the following examples will be explained. A region wide area (503) serviced by a region wide operating channel, E (504) or frequency represents and provides system coverage for a selective messaging unit in or throughout the region wide area. This region wide operating channel or frequency would ordinarily have or be assigned a lower status than other channels in the list of operating channels in the memory of a selective messaging unit. Additionally a lower priority may be assigned by the selective messaging system controller for channel E (504). This lower priority channel is the outbound, inbound for two-way systems, frequencies or channel and may occupy the channel E (306) near the "bottom" location in the memory. Within the region wide area or location two local coverage areas (505, 507) or zones are depicted. These local coverage areas or zones provide local zones of coverage or service for messaging units within these areas, these two coverage areas each operate on different operating channels or frequencies, respectively, channel A and B (506,508). The area (509) represents a region where the two local coverage areas have or provide overlapping coverage. In this area of overlap, either of the two operating channels or frequencies may be used to provide messages or service to selective messaging units within the area (509).

To determine what channel will be used to service the area (509), the selective messaging system controller (105) is arranged to communicate a channel preference to selective messaging units operating in the coverage areas (505, 507) near area (509). The memory (133) of the selective messaging system controller stores the list of available operating channels or channel list for the collective coverage area, and this list includes the first zone or channel, channel A (506), and the second zone or channel, channel B (508). The processor (131) of the selective messaging system controller handles or directs the process of choosing a preferred operating channel from the first channel and the second channel. This is done by setting a first priority for the first channel, channel A, (506), and setting a second priority to the second channel, channel B, (508). The first and second priorities are selected to correspond to the preferred channel, preferably such that a comparison between the two priorities yields one of the channels or the preferred channel. Once the preferred channel is chosen by the processor (131), the selective messaging system controller will schedule a message that corresponds to the preferred channel for selective messaging units within the coverage areas.

In the preferred form this message includes a message on each of the channels where their messages reflect the respective priority of each channel in the BIW for that channel. At a selective messaging unit the receiver detects both BIWs, a comparison of the priorities will correspond to the preferred channel. For example, suppose the operator has a preference for coverage area (505) rather than area (507). While countless improbabilities may influence this preference, some dynamic and some static, suppose the relatively small area (505) is reflected in normally less loading on channel A (506). The operator realizing this may wish to bias service for selective messaging units in the overlapping area (509) toward channel A. By covering via the I/O (132) a reflection of this operator preference to be stored in the memory (133), the processor will monitor this operator preference or changes thereto and order or rank order or assign or select priorities to reflect this preference. In the example, perhaps a priority of 5 would be selected for channel A (506) and a priority of 4 for channel B (508). A comparison would favor channel A (506) and selective messaging units in the overlapping area (509) would be expected to register on channel A. The memory (133) will be used to store various operator preferences, such as the relative number of potential selective messaging units above channel availability, die to maintenance or particular occasions, desired service levels, etc., as well as, operator parameters such as current loading. These preferences and parameters are monitored by the processor (131) and the channels from the channel list are ordered or rank ordered or prioritized based on the aforementioned preferences and operational parameters. Significant examination may be required to develop a satisfactory heuristic approach that considers the particulars of each system. When the processor (131) detects a change in an operator preference or operational parameter, the operations of choosing a preferred channel, setting the various channel priorities, and subsequently scheduling corresponding messages are, preferably, repeated.

Another example concerns the beam coverage areas (511, 513). The areas (511,513) result from two transmitters (515,517) that simulcast directional beams on an operating channel D (518) or frequency to a fixed location (519) that consistently experiences poor coverage (i.e.—inside a building (515)). These beams are on the same frequency or channel D (518) and the simulcast operation has been found to provide superior coverage. However it may be desirable to discourage messaging units within the beam coverage areas (511,513) from relying on these areas if they can still receive channel B (508). The principles of this disclosure may be applied and a lower priority assigned to channel D (518) than to channel B (508). Thus a selective messaging unit that receives both channels would register on or remain on channel B. However at location (519) only channel D would likely be received and the selective messaging units would register on that channel.

Figure 6:
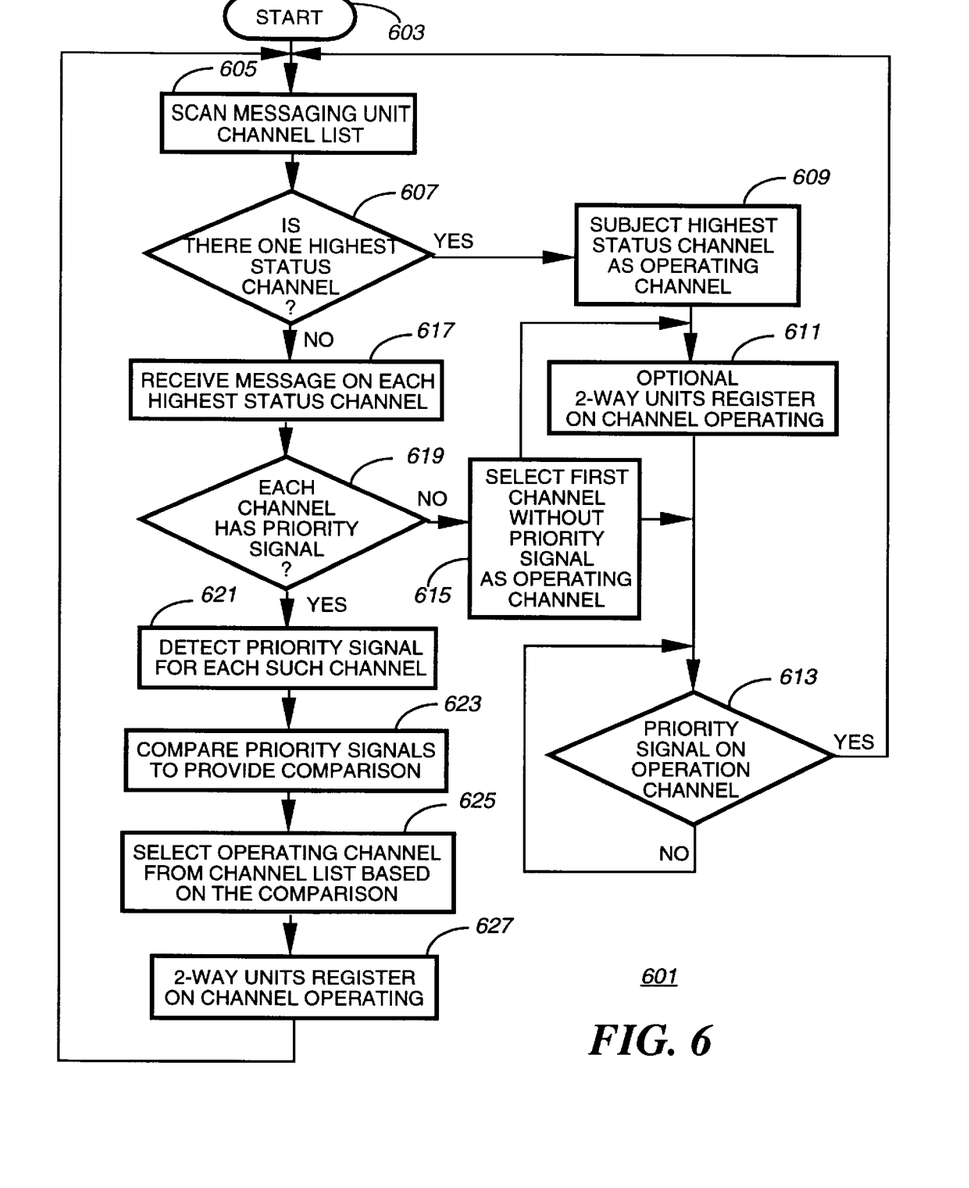
FIG. 6 is a flow chart of a preferred method embodiment in accordance with the present invention.

Referring to FIG. 6 a process or method of registering on or selecting an operating channel set in a selective messaging unit is depicted. The method is preferably implemented by suitably programming the controller (219) with software readily written by one of ordinary skill in the art given the principles disclosed herein. The method begins or starts at (603) after which, at step (605) the selective messaging unit scans a channel list that includes a list of potential operating channels for the unit. As the selective messaging unit scans the channels in its memory, step (607), preferably determines whether one of these channels has the highest status. If so, the selective messaging unit will select that highest status channel as the operating channel at step (609) and then step (611) allows two way selective messaging units to register on the operating channel. Subsequent to step (611), the selective messaging unit will determine, at step (613) whether a priority signal exists of the operating channel. If so, the selective messaging unit will resume scanning or again scan the channel list at step (605). When step (613) does not detect a priority signal on the operating channel, the selective messaging unit will continue to periodically look for a priority signal. If one or a single channel is not the highest status channel at step (607), the selective messaging unit will receive messages on each of the multiple highest status channels at step (617) and then, step (619), determines whether each of these channels has a channel priority signal associated with it. If not, step (615) selects the first such channel without a priority signal or the operating channel and the process moves to step (611). If so, the priority signal for each channel is detected at step (621) by preferably, the receiver or controller of the selective messaging unit. Next step (623) compares the priority signals to provide various comparisons, and step (625) selects an operating channel from the channel list (615) based on the aforementioned comparisons. For the preferred two way selective messaging unit, the selective messaging unit will register on the selected operating channel (627) prior to resuming scanning of the channel list at step (605).

Figure 7:
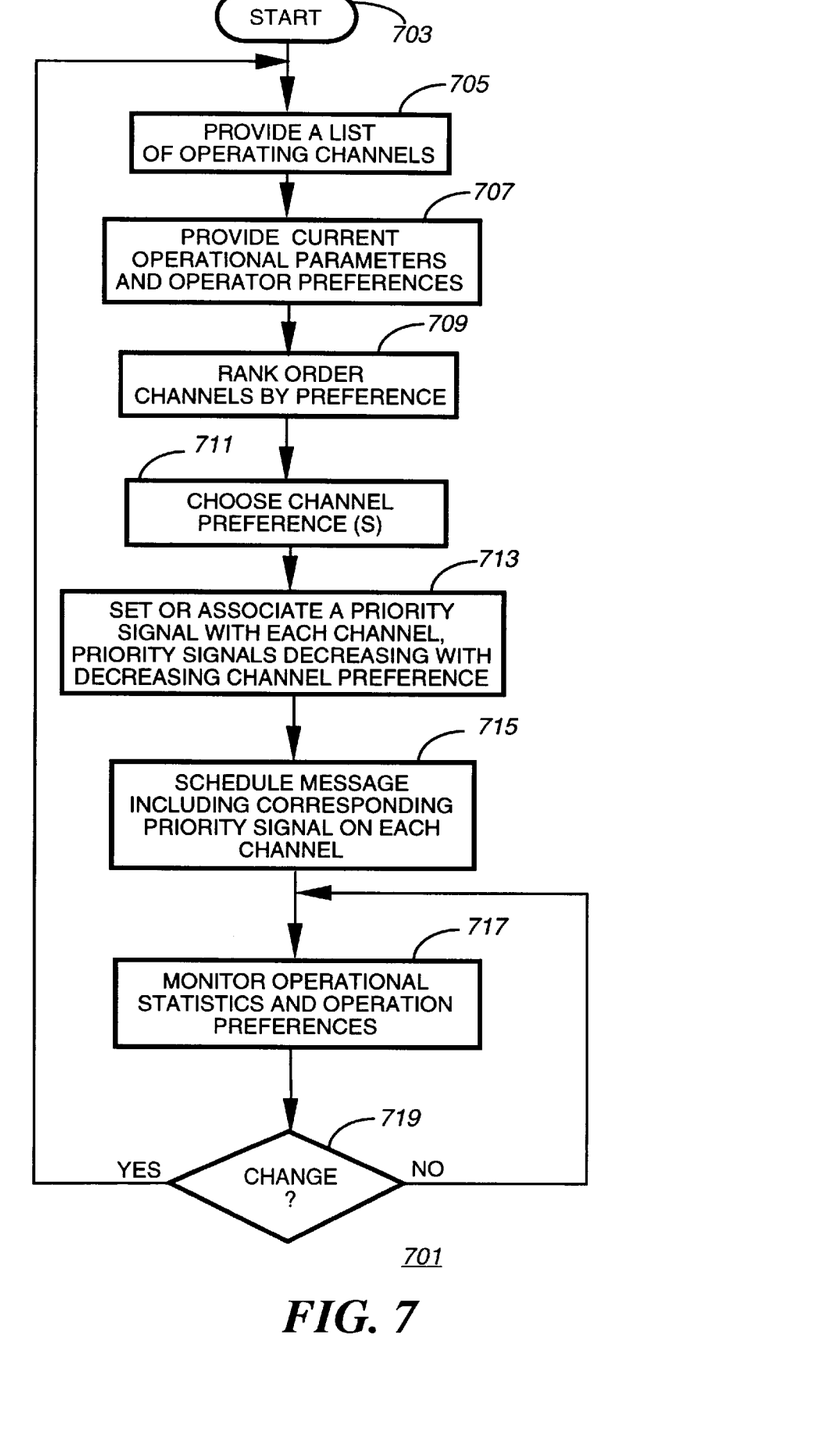
FIG. 7 is a flow chart of an alternative preferred method embodiment in accordance with the present invention.

Referring to FIG. 7 a process or method of communicating a channel preference to a selective messaging unit by, for example, the controller of a selective messaging system is depicted. The method begins or starts at step (703), followed by step (705) where a list of operating channels is provided to the controller. Step (707), then provides the current operational parameters and operator preferences to be considered by the controller. The system controller ranks orders the list of operating channels based on the aforementioned parameters and preferences at step (709). Step (711) then chooses the channel preferences from the ordered list. Then step (713) sets or associates a priority signal with each channel, and this priority signal decreases with the decreasing channel preference within the ordered list of operating channels. At step (715), the controller of the selective messaging system will schedule a message including a corresponding priority signal on each channel. The system controller will continuously monitor the operational statistics an(i operator preferences at step (717) as long as there is no change in the operational statistics or operator preferences as determined at step (719). When there is a change in the operational statistics or operator preferences from step (719), the controller of the selective messaging system will cause the process to repeat from step (705).

The inventive principles disclosed herein allow for coordination of the channel selection process. By reducing the effect of unnecessary background scanning in selective messaging units, and reducing inefficient channel utilization by selective messaging systems, the modification and choice of operating channel selection is improved over known techniques. This is accomplished without the degradation of messaging accuracy or burdening the resources in the selective messaging unit or the selective messaging system.

It will be apparent to those skilled in the art that the disclosed invention may be modified in numerous ways and may assume many embodiments other than the preferred forms specifically set out and described above. Accordingly, it is intended by the appended claims to cover all modifications of the invention which fall within the true spirit and scope of the invention.

What is claimed is:

1. A method in a selective messaging unit of selecting an operating channel, including the steps of:
   detecting a first priority signal on a first channel and a second priority signal on a second channel;
   comparing said first priority signal and said second priority signal to provide a comparison; and
   selecting, based on said comparison, the operating channel from said first channel and said second channel.

2. The method of claim 1 further including a step of scanning a channel list and detecting multiple equivalent status channels.

3. The method of claim 2 further including repeating said steps of scanning, detecting, comparing, and selecting.

4. The method of claim 1 further including registering on said operating channel.

5. In a selective messaging system a method of communicating a channel preference to a selective messaging unit, the method including the steps of:
   choosing a preferred channel from a first channel and a second channel;
   setting a first priority for said first channel and a second priority for said second channel, said first priority and said second priority selected to correspond to said preferred channel; and
   scheduling a message including said first priority for the selective messaging unit on said first channel and a message including said second priority on said second channel, a comparison of said messages corresponding to said preferred channel.

6. The method of claim 5 further including a step of monitoring an operational parameter and ordering channels from a channel list according to said operational parameter.

7. The method of claim 6 further including a step of detecting a change in said operational parameter and responsive thereto repeating said steps of choosing, setting, and scheduling.

8. The method of claim 7 wherein said step of detecting further includes detecting a change in a channel loading.

9. The method of claim 5 further including a step of monitoring an operator preference and ordering channels from a channel list according to said operator preference.

10. The method of claim 9 further including a step of detecting a change in said operator preference and responsive thereto repeating said steps of choosing, setting, and scheduling.

11. The method of claim 10 wherein said step of detecting further includes detecting a change in a channel availability.

12. A selective messaging unit arranged to select an operating channel, the selective messaging unit comprising in combination:
   a receiver for scanning channels and detecting a first priority signal on a first channel and a second priority signal on a second channel; and a controller coupled to said receiver and arranged to compare said first priority signal and said second priority signal; and, responsive thereto, select the operating channel from said first channel and said second channel.

13. The selective messaging unit of claim 12 wherein said receiver scans a channel list and detects a plurality of equivalent status channels.

14. The selective messaging unit of claim 12 wherein said receiver and said controller periodically repeat there, respective, operations.

15. The selective messaging unit of claim 12 further including a transmitter, coupled to said controller, and operating to transmit a registration signal on said operating channel.

16. A selective messaging system controller arranged for communicating a channel preference to a selective messaging unit, the selective messaging system comprising in combination:

a memory for storing a channel list including a first channel and a second channel; and a processor for choosing a preferred channel from said first channel and said second channel; setting a first priority for said first channel and a second priority for said second channel, said first priority and said second priority selected such that a comparison corresponds to said preferred channel, and scheduling a message including said first priority for the selective messaging unit on said first channel and a message including said second priority on said second channel, a comparison of said messages corresponding to said preferred channel.

17. The selective messaging system controller of claim 16 wherein said memory stores an operational parameter and said processor monitors said operational parameter and orders channels from said channel list according to said operational parameter.

18. The selective messaging system controller of claim 17 wherein said processor further detects a change in said operational parameter and responsive thereto repeats the operations of choosing, setting, and scheduling.

19. The selective messaging system controller of claim 18 wherein said processor further detects a change in a channel loading.

20. The selective messaging system controller of claim 16 wherein said memory stores an operator preference and said processor monitors said operator preference and orders channels from said channel list according to said operator preference.

21. The selective messaging system controller of claim 20 wherein said processor further detects a change in said operator preference and responsive thereto repeats the operations of choosing, setting, and scheduling.

22. The selective messaging system controller of claim 21 wherein said processor further detects a change in a channel availability.

* * * * *